(12) United States Patent
Chopart (10) Patent No.: US 11,005,653 B2
(45) Date of Patent: May 11, 2021

(54) INTEGRATED METHOD AND DEVICE FOR STORING AND SHARING DATA (71) Applicant: AIRBUS HELICOPTERS, Marignane (FR)

(72) Inventor: Stephane Chopart, Les Pennes Mirabeau (FR)

(73) Assignee: AIRBUS HELICOPTERS, Marignane (FR)

( * ) Notice: Subject to any disclaimer, the term of this patent is extended or adjusted under 35 U.S.C. 154(b) by 84 days.

(21) Appl. No.: 16/313,582

(22) PCT Filed: Feb. 19, 2018

(86) PCT No.: PCT/EP2018/054046
§ 371 (c)(1),
(2) Date: Nov. 6, 2019

(87) PCT Pub. No.: WO2018/158102
PCT Pub. Date: Sep. 7, 2018

(65) Prior Publication Data
US 2020/0076596 A1    Mar. 5, 2020

(30) Foreign Application Priority Data

Feb. 28, 2017 (FR) ..................................... 1700195
Oct. 30, 2017 (FR) ..................................... 1771144

(51) Int. Cl.
*H04L 9/08* (2006.01)
*H04L 9/06* (2006.01)
(Continued)

(52) U.S. Cl.
CPC .......... *H04L 9/0891* (2013.01); *H04L 9/0643* (2013.01); *H04L 9/0825* (2013.01);
(Continued)

(58) Field of Classification Search
CPC ... H04L 9/0891; H04L 9/0643; H04L 9/0825; H04L 9/30; H04L 2209/38; B64D 45/00
See application file for complete search history.

(56) References Cited

U.S. PATENT DOCUMENTS 8,190,911 B2 *   5/2012   Chopart ................ H04L 9/3247
                                                             713/189
8,756,428 B2 *   6/2014   Touzeau ................ H04L 9/3247
                                                             713/178
(Continued)

FOREIGN PATENT DOCUMENTS

CN    106097101 A    11/2016
CN    106301792 A    1/2017
(Continued)

OTHER PUBLICATIONS

Conner et al., "A Decntralized Public Key Infrastructure with Identity Retention." Nov. 11, 2014, 16 pages. (Year: 2014).*
(Continued)

*Primary Examiner* — Yonas A Bayou
(74) *Attorney, Agent, or Firm* — Brooks Kushman P.C.

(57) ABSTRACT

The present invention relates to a method for sharing secure data between players (5) on a net said method comprising a cryptography step for data using an asymmetrical cryptographic method with double keys, each player (5) having at least one said double key. The method includes a step for initializing (STP1) a blockchain that includes an operation for storing, at least one initialization block (26) in the blockchain by a predetermined authority using at least one computer, said at least one initialization block (26) comprising at least one said transaction (36) that includes an identity record (84) of a major player, said authority no longer intervening at the end of the initialization step (STP1) at least outside a reinitialization step of a player.

20 Claims, 1 Drawing Sheet

(51) Int. Cl.
  *H04L 9/30* (2006.01)
  *B64D 45/00* (2006.01)
(52) U.S. Cl.
  CPC .............. *H04L 9/30* (2013.01); *B64D 45/00* (2013.01); *H04L 2209/38* (2013.01)

(56) References Cited

U.S. PATENT DOCUMENTS

| | | | | |
|---|---|---|---|---|
| 2002/0015492 | A1* | 2/2002 | Ohmori | H04L 9/0894 380/37 |
| 2015/0244690 | A1* | 8/2015 | Mossbarger | H04L 9/006 713/171 |
| 2015/0365436 | A1* | 12/2015 | Shenefiel | H04L 63/102 726/1 |
| 2016/0028552 | A1* | 1/2016 | Spanos | H04L 9/3236 713/178 |
| 2016/0072800 | A1* | 3/2016 | Soon-Shiong | H04L 63/0861 726/7 |
| 2016/0180338 | A1* | 6/2016 | Androulaki | H04L 9/3228 705/71 |
| 2016/0212146 | A1* | 7/2016 | Wilson | H04L 9/3226 |
| 2016/0261411 | A1* | 9/2016 | Yau | H04L 63/0869 |
| 2016/0283920 | A1 | 9/2016 | Fisher et al. | |
| 2016/0330027 | A1* | 11/2016 | Ebrahimi | G06F 21/34 |
| 2018/0060600 | A1* | 3/2018 | Hamel | H04L 9/0897 |
| 2018/0062835 | A1* | 3/2018 | Hamel | H04L 9/0894 |

FOREIGN PATENT DOCUMENTS

| | | |
|---|---|---|
| CN | 106301794 A | 1/2017 |
| FR | 2912578 A1 | 8/2008 |
| FR | 2922702 A1 | 4/2009 |
| FR | 3018379 A1 | 9/2015 |

OTHER PUBLICATIONS

Mitten Opinion and International Search Report for PCT/EP2018/054046, Completed by the European Patent Office, dated Mar. 15, 2018, All together 17 Pages.
Fromknecht, et al., "A Decentralized Public Key Infrastructure with Identity Retention," International Association for Cryptologic Research, Nov. 11, 2014, pp. 1-16, vol. 20141111:124302 (16 Pages).
Mecir, Ladislav, "Blockchain," Wikipedia, Nov. 16, 2016, URL: https://en.wikipedia.org/w/index.php?title=Blockchain&ildid=749853094, retrieved from the internet on Jul. 28, 2017 (10 Pages).
"Bitcoin," https://en.wikipedia.org/wiki/Bitcoin, Wikipedia, Last updated Dec. 21, 2017 (64 Pages).
"Blockchain," https://en.wikipedia.org/wiki/Blockchain, Wikipedia, Last updated Dec. 21, 2017 (21 Pages).
Description of Publication "Spec 42: Aviation Industry Standards for Digital Information Security," Air Transport Association of America, Inc., URL: https://publications.airlines.org/Spec42AviationIndustry Standards for Digital Information Security, Jan. 2008 (Rev. Jan. 2018), Airlines for America (1 Page).
"Real Talk With AgustaWestland," Xerox Corporation, 2011, URL: https://www.xerox.com) casestudies) gdo_casestudy_AgustaWestland_UK, (2 Pages).
Brito, et al., "BITCOIN: A Primer for Policymakers," Mercatus Center George Mason University, 2013 (48 Pages).
"Information Technology—Open Systems Interconnection—The Directory: Public-key and Attribute Certificate Frameworks," International Telecommunication Union, Series X: Data Networks, Open System Communication and Security, X.509, Nov. 2008 (186 Pages).
Jeanneau, et al, "La Blockchain Décryptée: Les Clefs D'une Révolution," May 2016, Blockchain France and Netexplo, Paris, France (144 Pages, incl. English machine translation of summary).
"Shamir's Secret Sharing," https://en.wikipedia.org/wiki/Shamir's_Secret_Sharing, Wikipedia, Last updated May 8, 2019 (7 Pages).
Kumar, et al., "Performances of Cryptographic Accumulators," URL: http://sancy.univ-bpclermont.fr/-lafourcade/PAPERS/PDF/KLL14.pdf, Clermont Auvergne University, France, 2014 (4 Pages).
Nakamoto, Satoshi, "Bitcoin: A Peer-to-Peer Electronic Cash System," URL: https://bitcoin.org/bitcoin.pdf, May 24, 2009 (9 Pages).
Fromknecht, et al., "A NameCoin Based Decentralized Authentication System," URL: https://courses.csail.mit.edu/6.857/2014/files/19-fromknecht-velicann-yakoubov-certcoin.pdf, MIT 6.857 Class Project, May 14, 2014 (19 Pages).
Dickson, Ben, "How Blockchain Can Improve Cybersecurity," URL: https://bdtechtalks.com/2017/01/11/how-blockchain-can-improve-cybersecurity/, Jan. 11, 2017, TechTalks (4 Pages).
Brook, Chris, "Polish Planes Grounded After Airline Hit With DDoS Attack," URL: https://threatpost.com/polish-planes-grounded-after-airline-hit-with-ddos-attack/113412/, Jun. 22, 2015, Threatpost (6 Pages).
SUIVRE@ZDNET.FR, "Hacked, DigiNotar Certification Authority Goes Bankrupt," URL: http://www.zdnet.fr/actualites/piratee-l-autorite-de-certification-diginotar-est-en-faillite-39764136.htm, CBS Interactive Inc., mod. Sep. 21, 2011, CUP Interactive SAS (France) (17 Pages, incl. English machine translation).
Aas, Josh, "What is Costs to Run Let's Encrypt," URL: https://letsencrypt.org//2016/09/20/what-it-costs-to-run-lets-encrypt.html, Sep. 20, 2016, Linux Foundation (3 Pages).
"Public-Key Infrastructure (X.509) (pkix) Charter for Working Group: About," URL: https://datatracker.ietf.org/wg/pkix/charter.html, Oct. 19, 1995, IETF Datatracker (4 Pages).
First Chinese Office Action & Search Report dated Jan. 6, 2021 (with English Translation), Application No. 201880002670.3, Applicant Airbus Helicopters, 15 Pages.
"The blockchain hub in France," May 2016, URL: https://blockchainfrance.net/, (7 Pages, including Machine Translation).
Teso, Hugo, "Aircraft Hacking: Practical Aero Series," n.runs Professionals—Security Research Team, Apr. 2013, URL: https://conference.hitb.org/hitbsecconf2013ams/materials/D1T1%20-%20Hugo%20Tesoc%20-%20Aircraft%20Hacking%20-%20Practical%20Aero%20Series.pdf (44 Pages).
"Namecoin," Aug. 16, 2017, URL: https://namecoin.org (6 Pages).
"Emercoin Blockchain," Aug. 16, 2017, URL: https://emercoin.com/ (6 Pages).

* cited by examiner

INTEGRATED METHOD AND DEVICE FOR STORING AND SHARING DATA

CROSS-REFERENCE TO RELATED APPLICATION

This application is the U.S. national phase of PCT Application No. PCT/EP2018/054046 filed on 19 Feb. 2018, which claims priority to French Patent Application No. FR 1771144 filed on 30 Oct. 2017 and French Patent Application No. 1700195 filed 28 Feb. 2017, the disclosures of which are incorporated in their entirety by reference herein.

BACKGROUND OF THE INVENTION

(1) Field of the Invention

The present invention relates to a method and device for storing and sharing secure data, in particular in the aeronautic and aerospace field.

(2) Description of Related Art

In the aeronautic and aerospace field, all types of data are shared between various people and entities. In particular, data can be shared between an aircraft and a system present outside the aircraft.

These data may assume various forms. For example, these data may assume the form of software or configuration data to be downloaded on a system on board an aircraft, software and flight data that contribute to flight operations and maintenance activities of the aircraft, software and data received on board an aircraft to manage fleets of aircraft, digitized administrative and/or technical and/or operational documents. These data may represent any other digital information that may affect flight safety, flight or industrial operations, intellectual property, image, etc.

The shared data may be traced to identify their sources and recipients. These data may optionally be available for several different players, for example various aircraft, various airlines, various governmental agencies, etc. Furthermore, these data must be secure and authentic so as not to create an incident. Furthermore, the data to be shared may be confidential.

These four conditions are difficult to obtain. Indeed, computer attacks may seek to alter the data, and may affect the reliability and/or traceability of the shared data.

Furthermore and on an aircraft in flight, the data are subject to a risk of loss in case of failure or accident. When the data are stored on a storage medium of the aircraft before being transferred to the ground to other players, an involuntary destruction of the storage medium may cause the loss of the stored data.

Some technical solutions consist of authenticating the people, services or equipment that are interacting with the sensitive systems, to determine whether they are authorized to act or whether they are unauthorized elements, possible attack vectors. Technical solutions are thus based on the use of digital certificates according to the PKIX specification, which implements asymmetrical cryptographic mechanisms.

These solutions use a trusted third party that is recognized by the various players on the network. Such a trusted third party is sometimes called "Certification Authority," in reference to the concept of "digital certificate" used by the technical standard applicable in the area known under the acronym "PKIX."

According to a solution of this type, a certification authority issues each user three pairs of keys, each including a public key and a private key, and the associated certificates. These three pairs of keys are respectively used to meet authentication, signature and encryption needs. A certificate certifies that a pair of keys belongs to a specific user. A certificate may for example contain a serial number, the type of signature used, the identification of the trusted third party, issue and validity dates, the identification of the owner of the keys, etc. For example, a certificate may be established according to standard X509.

Thus, a user may sign data by using a first pair of keys to guarantee the authenticity of the data and protect their integrity. The data or a digital imprint of said data are signed with the public key of the first pair of keys, to allow the verification of said signature by third parties using the certificate and the public key of the first pair of keys.

Thus, a user may encrypt data by using a second pair of keys to guarantee their confidentiality. The user can derive a symmetrical key from the private key of the second pair of keys. The data are then encrypted using said symmetrical key. Said symmetrical key is in turn encrypted with the public key of the recipient. The encrypted data and the encrypted symmetrical key are sent to the recipient. The recipient can then decrypt the symmetrical key using its private key, then decrypts the data using the symmetrical key.

The third pair of keys can be used for authentication purposes.

For example, one solution of this type is known under the acronym "PM," corresponding to the expression "public key infrastructure."

Documents FR 2,912,578, FR 2,922,702 illustrate such solutions.

Although seductive, these technical solutions may prove delicate to implement.

A solution of the PKI type involves using a certification authority to manage the various keys and the certificates. To guarantee a good management of the keys, heavy and complex processes are carried out. For example, a pair of keys has a limited lifetime. Obtaining a pair of replacement keys at the end of this lifetime necessarily involves approaching the certification authority. This certification authority is therefore always approached.

Furthermore, the trust granted by users to a solution of this type is in fact related to the trust granted to the certification authority. One difficulty therefore lies in finding a trusted third party that satisfies all players, in particular in an international/intercontinental context.

Furthermore, the use of a centralized certification authority may pose a security problem. If this centralized certification authority is the victim of an attack, the security of the entire network is compromised.

Furthermore, the certification authority may comprise a sequestration entity. The sequestration entity is used to sequester the keys used for data encryption, in order to restore them if needed. There are several reasons for such an entity. Indeed, the loss of a private key by its holder must not be permanent. Furthermore, an organization may wish to be able to decrypt documents when one of its members has left. Lastly, in some countries, the law requires that encrypted data be able to be decrypted upon demand by national authorities.

In an international context, this last requirement may pose difficulties, since each country tends to want the sequestrator to be on its own soil for the keys encrypting messages for its citizens.

Furthermore, if a user makes a manipulation or software configuration mistake during the verification of the electronic signatures, the chain of trust making it possible to go back to the root certification authority may be compromised in some cases.

Technical solutions consisting of making collected data available, for example from aircraft, are more traditional. These solutions may consist of storing said data in several physically separate locations. Access to the data is guaranteed even if a storage location is destroyed. For example, each player may have his own copy.

However, synchronizing all of the data may be delicate. Making sure that the databases of the different players are up to date may be difficult and expensive.

Document FR 3,018,379 does not belong to the field of the invention, and does not provide any solution to the posed problem. This document is cited purely for information. Likewise, document US 2016/0283920 is known.

The technical solution known under the name Certcoin is also known. The system known under the name namecoin seeks to manage domain names.

The following websites are also known:
https://conference.hitb.org/hitbsecconf2013ams/materials/HugoTeso Aircraft Hacking Practical Aero Series.pdf
https://publications.airlines.org/Spec42 Aviation Industry Standards for Digital Information Security
https://datatracker.ietforg/wg/pkix-charter.html
https://letsencrypt.org//2016/09/20/what-it-costs-to-run-lets-encrypt.html.
http://www.zdnet.fr/actualites/piratee-l-autorite-de-certification-diginotar-est-en-faillite-39764136.htm
https://threatpost.com/polish-planes-grounded-after-airline-hit-with-ddos-attack/113412/
https://bdtechtalks.com/2017/01/11/how-blockchain-can-improve-cybersecurity/
https://courses.csail.mit.edu/6.857/2014/files/19-fromknecht-velicann-yakoubov-certcoin.pdf
https://bitcoin.org/bitcoin.pdf
https://defensecontractormarketing.com/top-100-aerospace-companies-2015/
http://sancy.univ-bpclermont.fr/~lafourcade/PAPERS/PDF/KLL14.pdf
http://emercoin.com/

BRIEF SUMMARY OF THE INVENTION

The present invention then aims to propose a method for generating and managing double keys and data exchanges that is in particular suitable for the aeronautic and aerospace environment.

The invention targets a method for storing and sharing secure data between players on a network, the method comprising a cryptography step for data using an asymmetrical cryptographic method with double keys, each player having at least one said double key.

A blockchain being implemented, a block comprising a digital imprint of the block preceding it in the blockchain and at least one transaction that comprises data to be shared, at least one block being an initialization block initializing the blockchain and at least one block being a registration block for a new player, at least one said player being a major player, at least one said player being a subordinate player and at least one said player being a piece of computer equipment, one said major player being authorized to request membership in said network for a new major player as well as a new subordinate player and a new piece of computer equipment, one said subordinate player being authorized to request membership in said network for a new piece of computer equipment, the method includes:

a step for initializing the blockchain that includes an operation for storage of said at least one initialization block in the blockchain by a predetermined authority using at least one computer, said at least one initialization block comprising at least one said transaction that includes an identity record of a major player, a step for acceptance of a new player that includes an operation for storage of at least one registration block for a new player in the blockchain by one said major or subordinate player using at least one computer, said at least one registration block for a new player comprising at least one said transaction that includes an identity record of said new player.

One said identity record of a major/subordinate player or piece of computer equipment comprising identification data of said major/subordinate player or piece of computer equipment that includes at least one identifier of said major/subordinate player or piece of computer equipment, a public key of a double key called signature double key of said major player/subordinate player or piece of computer equipment intended for the data signature, a public key of a double key called encryption double key of said major player/subordinate player or piece of computer equipment intended for the data signature, a public key of a double key called revocation double key for said major player/subordinate player or piece of computer equipment intended to revoke at least the encryption double key and the signature double key of said major player/subordinate player or piece of computer equipment, said authority no longer intervening at the end of the initialization step or only intervening during a reinitialization step of a player after a revocation of the revocation double key of said player.

The expression "each player being associated with a double key comprising a private key and a public key" means that each player has a private key known only by him, and a public key that corresponds to the private key.

The expression "block comprising a digital imprint of the block preceding it" means that with the exception of the first block of the blockchain, each block includes the digital imprint of the block that precedes it in the blockchain.

The expression "major player" designates a person or entity provided with at least one computer connected to the network to apply the method according to the invention. Likewise, the expression "subordinate player" designates a person or entity provided with at least one computer connected to the network to apply the method according to the invention. The expression "computer equipment" refers to a piece of equipment connected to the network, for example a calculator of an aircraft.

As a reminder, a chain of blocks is also referred to as a "BlockChain." A BlockChain is in particular used in the financial field, and particularly in the "bitcoin" currency exchange system. Details about the BlockChain technology can be found on the Internet, for example at the following addresses: https://blockchainfrance.net/, https://en.wikipedia.org/wiki/Blockchain, https://en.wikipedia.org/wiki/Bitcoin A blockchain is a decentralized database that manages a data list protected against falsification or alteration. The transactions represent the exchanges between the network users, and are stored within blocks of the blockchain. The different recorded transactions are grouped together in blocks. After having recorded the recent transactions, a new block is mined by a player described as "miner," i.e., generated and analyzed. If the block is valid, the block can be timestamped and added to the blockchain. The transactions are then visible on the entire network. Once it is added to the blockchain, a block can no longer be altered or deleted, which guarantees the authenticity and security of the network.

The present invention uses the blockchain technology not to exchange currencies, but at least to store the public keys of the double keys of the players of a computer network. This network may be a private network and may bring together players in the aeronautic and aerospace field, each player representing a node of the computer network and comprising at least one computer connected to the computer network. The blockchain is then stored on at least one computer of certain players, or even all the players.

The blockchain may be described as an "aero" blockchain during a use within a network of players in the aeronautic and aerospace field.

This blockchain may be built in the typical manner. The protocol for building blocks may be a protocol known by those skilled in the art implementing a computer. This protocol may be associated with a consensus method. A new block is inserted into the blockchain only if a referring number of players have validated the block, for example via the processes known as "proof of stake" or "proof of work."

The frequency of creation of the blocks in the blockchain may be defined based on the number of players on a time basis, or based on a minimum number of transactions that must be contained in a block.

If the blockchain contains too many blocks to allow a complete copy of the blockchain onto a laptop computer, for example, the method may be based on cryptographic battery technology.

According to the invention, the blockchain includes at least one initialization block created and stored by a predetermined authority. This predetermined authority only intervenes at this stage of the process, unlike a typical PKI system, or only intervenes at this stage of the process and to reinitialize a player during a reinitialization step after a revocation key of said player is compromised.

According to one aspect, if the private revocation key of a player is compromised, a completely new recording cycle of said player may be undertaken either solely by major players, or solely by a predetermined authority and for example the authority approached during the initialization step, or by major players and/or a predetermined authority.

The initialization of the blockchain is done by an authority that mines the first blocks of the blockchain. These first blocks are blocks called "initialization block" for convenience and contain the identity records of major players of the network. These major players are players having the power to record all types of players.

This authority may be a known entity, for example one of the entities known under the acronyms OACI, FAA or EASA. Optionally, this authority may also take the form of a consortium of internationally companies perfectly identified as major players to avoid centralizing the initialization power of the blockchain.

After this initialization, the major players can store acceptance blocks of a new player in order to introduce a new player, this new player being able to be a major player, a subordinate player or a piece of computer equipment. The recorded subordinate players may store acceptance blocks of a new player solely to introduce a piece of computer equipment into the network. Players of the "computer equipment" type cannot record new players.

The recording of a piece of computer equipment is thus always done under the responsibility of a person or entity that is in turn already recorded and that guarantees the actions related to said new computer equipment.

Each identity record relative to a player is visible by all of the players of the network and includes at least three public keys of three double keys respectively for signature, encryption and revocation. The private keys of the double keys respectively for signature, encryption and revocation of a player are in the possession of said player.

Furthermore, an identity record includes at least one piece of information identifying the player in question. Such information may comprise an address of the player, the name of the player, whether said player is an entity or person or a piece of computer equipment, a registration number of the player, etc.

The players of the network may then refer directly to the blockchain stored on their computers to obtain the public keys of the different players as well as the information identifying them.

Furthermore, the management of the keys is done by the players themselves by addressing the blockchain at the end of the initialization step.

Subsequently, the notion of trusted third party may disappear completely at the end of the initialization step.

Additionally, the network players may then identify themselves by consulting the blockchain with a high level of assurance, the key creation and management mechanisms being implemented in a decentralized, resilient and transparent manner.

All of the network players may further verify themselves, with a computer, the reliability and authenticity of the electronic transactions emitted in the blockchain by using the public keys available online in the blockchain.

Furthermore, the transactions stored in the blockchain may comprise various data shared between the players, and in particular aeronautic data as previously described. These data may be signed or encrypted as needed respectively using signature and encryption double keys.

The revocation double key allows an actor to revoke and renew, if necessary, the signature double key and encryption double key of said player, in particular when said double keys are compromised or have expired according to a management policy of the digital identities of the blockchain.

This method may additionally include one or more of the following features.

One said identity record of a major player/subordinate player or piece of computer equipment may include an identification of a signature cryptographic algorithm associated with said signature double key of said major player/subordinate player or piece of computer equipment, an identification of an encryption cryptographic algorithm associated with said encryption double key of said major player/subordinate player or piece of computer equipment, an identification of a revocation cryptographic algorithm associated with said revocation double key of said major player/subordinate player or piece of computer equipment.

Thus, each network player may easily determine the cryptographic algorithm to be used by consulting the blockchain with a computer.

According to one aspect, one said identity record of a major player/subordinate player or piece of computer equipment may include a validity date of said signature double key of said major player/subordinate player or piece of computer equipment, and a validity date of said encryption double key of said major player/subordinate player or piece of computer equipment.

Each validity date may comprise an expiration date or a commissioning date of the associated double key. These data are accessible to all players by consulting the blockchain with a computer.

According to one aspect, one said identity record of a major player/subordinate player or piece of computer equipment may include an importance level of said major player/subordinate player or piece of computer equipment used during a validation operation of a block by proof of stake created by said major player/subordinate player or piece of computer equipment.

When a transaction is emitted by a player into the network, each player may take the form of a miner to mine a block. This block is then analyzed by computer by at least one other player in order to be validated or invalidated. If the block is invalidated, the transaction is not recorded. Conversely, if the block is validated, said block is stored in the last position in the blockchain.

The validation may be done via a consensus method, for example by proof of stake. The so-called validation system of the blocks by proof of stake favors players who have the greatest interest in the system through importance level. This importance level may be measured based on annual results by company, for example.

As an illustration, two importance levels may be defined, namely a high importance level and a low importance level. A block mined by a player having a high importance level may be introduced into the blockchain after validation by another player. Conversely, a block mined by a player having a low importance level may be introduced into the blockchain after validation by a player having a high importance level or after validation by at least two players having a low importance level.

Alternatively, a validation method of a block of the "proof of work" type may be implemented. The mining players may for example be remunerated through paid subscriptions by the players, for example.

Alternatively, a validation method of a block of the "proof of work"—"proof of stake" type may be considered. For example, the criteria applied to the proof of work method vary based on the importance level of the miner.

According to one aspect, at least one said identifier of a major player/subordinate player or piece of computer equipment may include a name of said major player/subordinate player or piece of computer equipment or an address of said major player/subordinate player or piece of computer equipment.

The address may take the form of a physical address, or an address of an email box, for example.

A role of this major player/subordinate player or piece of computer equipment on the network may also be defined, for example a role of aircraft manufacturer, a role of maintenance technician, a retailer role, an operational role, etc.

According to one aspect, the identification data of a player may include a level of assurance of said player making it possible to indicate how said player has been identified.

For example, the recording of new major players having the highest assurance level is done upon presentation of identity papers. To record a subordinate player having a lower assurance level, an address of an electronic mailbox corresponding to a domain name verified by another blockchain may be sufficient. For example, a chain of the NameCoin type described for example on the site https://name-coin.org/ may be used.

Thus, the player who sends a transaction to record a new player indicates the assurance level of said new player.

According to one aspect, one said identity record of a major player/subordinate player or piece of computer equipment may include a public key of a double key called "authentication double key" of said major player/subordinate player or piece of computer equipment intended for the authentication of said major player/subordinate player or piece of computer equipment.

An identity record may thus comprise several of the following attributes for a player: identity of the player (person or entity; computer equipment); address, role, "online" public key of a signature double key, "online" public key of an encryption double key, "online" public key of an authentication double key, "offline" public key of a verification double key, associated cryptographic algorithms, assurance level of the recording, importance level in the validation process of the blocks, validity dates of the double keys. This collection of attributes may be completed or modified according to the standards in force.

According to one aspect, if, for one said major player/subordinate player or piece of computer equipment, at least two blocks of said blockchain contain separate information relative to a same identification datum of said major player/subordinate player or piece of computer equipment, said at least two blocks having been inserted into said blockchain at different moments, said identification datum of said major player/subordinate player or piece of computer equipment that is in force at a current moment presents the information contained in said most recent at least two blocks.

The identification data of a player can evolve. In order to obtain the valid identification data at a given moment, it then suffices to access the blockchain with a computer. The most recent identification data are in fact the identification data in force.

For example, two different blocks contain the public signature key of a player. The public signature key of a player in force at a current moment is the public signature key contained in the most recent block.

Furthermore, a player may still have access to the old identification data of a player if needed, for example to decrypt the data contained in a transaction prior to the sending of the new identification data.

According to one aspect, the operation for storing at least one recording block of a new player may include the following operations:

sending, into the network, a request including one said identity record of said new player, while executing, with a computer of a recorded player, instructions stored in a memory for example, mining by one said player of the blockchain of one said identification block of a new player including said identity record of said new player, while executing, with a computer of the miner, instructions stored in a memory for example, validation of said block by at least one player of the blockchain separate from the player having performed said mining, while executing, with a computer of the miner, instructions stored in a memory for example, and storing after said validation of said block in the blockchain, while executing, with a computer of the miner, instructions stored in a memory for example.

In general, each separate transaction of an identity record carried out during the initialization step may follow this process. A transaction is emitted on the network by a player using a computer applying stored instructions. A player playing a miner role receives the transaction and creates a block including the transaction with a computer by applying a predetermined mining algorithm. At least one other player validates the block using a computer by verifying predetermined points, optionally automatically using stored instructions, then the miner stores the block in the blockchain of his computer when the required validations are acquired. The blockchain is then duplicated for example on each of the computers of the players on the network, optionally automatically, each computer consulting the network to update the blockchain.

In particular, a transaction relative to an identity record is verified by: verifying the identity of the new player according to the recording policy, verifying the cryptographic algorithms used, verifying the possession by the new player of the private keys associated with the public keys of the recording.

According to one aspect, the method may include a step for modifying keys during which one said player modifies at least one said double key belonging to it including a public key in force and a private key in force, said modification step comprising the following operations:

generating a new double key including a new public double key and a new private double key, while executing, with a computer of the player in question, instructions stored in a memory, for example, creating and sending to the network, while executing, with a computer of the player in question, instructions stored in a memory, for example, a transaction called "identification transaction" comprising an identifier of said player and the public key in force as well as the new public key and a cryptographic algorithm associated with said new public key, said identification transaction comprising said new public key and said identifier digitally signed with said private key in force as well as said identifier digitally signed with said new private key, inserting said identification transaction into a new block of the blockchain, while executing, with at least one computer of another player, instructions stored in a memory, for example.

Thus, a player may modify its signature double key, encryption double key or, if applicable, authentication double key by applying this method. A player does not need to call on a third-party authority to perform this modification.

To insert an identification transaction into a new block, the validation of the identification transaction may be required.

According to one aspect, said operation for inserting said identification transaction into a new block of the blockchain may then include:

a phase for verification of said identification transaction by at least one player of said network that includes:

a verification that said public key in force belongs to the player having said identifier by consulting the blockchain with a computer, executing, with a computer of a mining player, instructions stored in a memory, for example, a first decryption with a computer and the public key in force of said new public key and said identifier signed digitally by the private key in force, by executing, with a computer of a mining player, instructions stored by a memory, for example, a determination of a first equivalence between said new public key and said identifier obtained by said first decryption and respectively the public key in force and the identifier that are stored in the identification transaction, by executing, with a computer of a mining player, instructions stored in a memory, for example, a second decryption with a computer and the new public key of said identifier signed digitally by the new private key, by executing, with a computer of a mining player, instructions stored by a memory, for example, a determination of a second equivalence between said identifier obtained by said second decryption and the identifier stored in the identification transaction, by executing, with a computer of a mining player, instructions stored in a memory, for example, a validation of said identification transaction in the presence of the first equivalence and the second equivalence, by executing, with a computer of a mining player, instructions stored in a memory, for example, a phase for creating a new block including said identification transaction in case of validation, by executing, with a computer of a mining player, instructions stored in a memory, for example.

The emitted identity transaction is thus verified during the verification phase by a player called "mining player" different from the player having emitted the identity transaction. In particular, this mining player verifies at least: the identity—public key correspondence in force by querying, with a computer, the last block of the blockchain containing the public key in question, the signature done with the public key in force, the signature done with the new public key.

Once these verifications are done, a new block containing the identification transaction may be mined by the mining player. When at least one player has validated the new mined block using a consensus method, the new block is stored in the blockchain of the mining player. The blockchain is also duplicated on each of the computers of the players on the network.

According to one aspect, the method may include a revocation step during which one said player revokes at least one said double key belonging to it including a public key in force and a private key in force, said revocation step comprising the following operations:

generating a new double key including a new public double key and a new private double key, while executing, with a computer of the player in question, instructions stored in a memory, for example, creating and sending, while executing, with a computer of the player in question, instructions stored in a memory, for example, to the network, a revocation transaction comprising an identifier of said player and the public revocation key of said player and the public key in force to be revoked as well as the new public key and a cryptographic algorithm associated with said new public key, said revocation transaction comprising said new public key and said identifier digitally signed with said private revocation key as well as said identifier digitally signed with said new private key, inserting said revocation transaction into a new block of the blockchain, while executing, with at least one computer of a mining player, instructions stored in a memory, for example.

Thus, a player may revoke its signature double key, encryption double key or, if applicable, authentication double key by applying this method. A player does not need to call on a third-party authority to perform this modification.

To be inserted into a new block, the validation of the revocation transaction may be required.

According to one aspect, said operation for inserting said revocation transaction into a new block of the blockchain may include:

a phase for verification of said revocation transaction by at least one player of said network that includes:

a verification that said public revocation key belongs to the player having said identifier by consulting the blockchain with a computer, executing, with a computer of a mining player, instructions stored in a memory, for example, a first decryption with a computer and the public key in force of said new public key and said identifier signed digitally by the private revocation key, by executing, with a computer of a mining player, instructions stored by a memory, for example, a determination of a first equivalence between said new public key and said identifier obtained by said first decryption and respectively the public key in force and the identifier that are stored in the revocation transaction, by executing, with a computer of a mining player, instructions stored in a memory, for example, a second decryption with a computer and the new public key of said identifier signed digitally by the new private key, by executing, with a computer of a mining player, instructions stored by a memory, for example, a determination of a second equivalence between said identifier obtained by said second decryption and the identifier stored in the revocation transaction, by executing, with a computer of a mining player, instructions stored in a memory, for example, a validation of said new block in the presence of the first equivalence and the second equivalence, by executing, with a computer of a mining player, instructions stored in a memory, for example, a phase for creating a new block including said revocation transaction in case of validation, by executing, with a computer of a mining player, instructions stored in a memory, for example.

The emitted revocation transaction is thus verified during the verification phase by a player called "mining player" different from the player having emitted the identity transaction. Once the required verifications are done, a new block containing the revocation transaction may be mined by the mining player. When at least one player has validated the new mined block using a consensus method, the new block is stored in the blockchain of the mining player. The blockchain is also duplicated on each of the computers of the players on the network.

According to one aspect, the method may include a key sequestration step that includes the following operations for one said player:

creating a copy of the encryption double key of said player, while executing, with a computer of the miner, instructions stored in a memory for example.

encrypting the copy with a public key of an encryption double key of a security officer of said player to obtain an encrypted element, while executing, with a computer of the miner, instructions stored in a memory for example.

then encrypting the encrypted element with an public encryption key of a major player different from said player, while executing, with a computer, instructions stored in a memory for example.

No dedicated sequestration authority is then necessary. The use of the sequestration key of a network player is done based on a dual agreement by the security officer of said player, plus the agreement of the major player possessing the private key corresponding to the public encryption key used to encrypt the encrypted element.

An alternative is based on the principle known as "shared secret" developed by Adi Shamir and described at the following address: https://en.wikipedia.org/wiki/Shamir's_Secret Sharing According to one aspect, to digitally encrypt data and send them to one said player called "recipient," the data being contained in a transaction called "data transaction," the method may include the following operations: consulting the blockchain to obtain the public encryption key in force allocated to the recipient of the data, and encrypting data with said public encryption key of the recipient.

To sign data digitally, a player called "sender" uses its signature private key to sign the data digitally, another player called "recipient" consulting said blockchain to obtain the public signature key from the sender in order to decrypt the data signed by the sender.

Furthermore, the shared data may be recorded in blocks of the blockchain to be traced and stored in a decentralized manner.

Depending on the type of implementation chosen, the blocks may contain an imprint of the shared data and/or the shared data themselves.

To record a transaction called "signed data transaction" in the blockchain, said signed data transaction comprising data to be shared that are signed digitally, the data to be shared including original data or a digital imprint of the original data called "first transmission imprint" obtained using a hash method, the method may include the following operations, optionally carried out using a computer executing stored instructions:

encryption of the data to be shared, which are to be signed digitally by signing them with the private signature key of a player called "sender," to obtain said data to be shared that are signed digitally, sending the network the signed data transaction including the data to be shared that are signed digitally, creating a block called "new block" by a player called "miner," said new block comprising at least one digital imprint of the last block of the blockchain and said signed data transaction, validation of the new block by at least one said player, insertion of the new block into the blockchain after said validation.

Such a signed data transaction may then contain a number, a sender identity, a date and time of the transaction, the transaction type, the imprint of the data or the original data signed by the sender.

Original data may be processed to be recorded in one or several blocks based on their sizes.

Alternatively, the original data are sent in the form of a digital imprint, for example by applying a known hash algorithm such as the SHA256 algorithm. In this case, it is not the signed original datum that is recorded in a block, but a signed digital imprint of said original datum. Optionally, the original datum may be transmitted by another communication channel, possibly not secured, or with the digital imprint. In this type of implementation, the original data may reach the recipient with the corresponding record number so as to find this record in the blockchain.

According to one aspect and when the data to be shared takes the form of one said first transmission imprint, said miner having received said original data, the method includes a verification operation carried out before building the new block, optionally using a computer executing stored instructions. The verification operation comprises the following operations:

consulting said blockchain to obtain the public signature key in force for the sender, decrypting, with the public signature key in force of the sender, data to be shared that are signed digitally in order to obtain said first transmission imprint, producing a digital imprint called "control imprint" of the original data, comparing the control imprint and said first transmission imprint, rejecting the transaction when there is a difference between the control imprint and said first transmission imprint.

A transaction can thus be validated before insertion into a block by verifying the signature and the address of the owner through this procedure. If the control imprint and said first transmission imprint are different, the miner can deduce that the data to be shared have not been signed correctly. The miner then rejects the transaction, for example by storing it elsewhere.

Optionally, the miner can also verify that the date of the transaction matches the current date.

When the data to be shared takes the form of one said first transmission imprint, a recipient can perform the following operations:

verifying said first signed data transaction, optionally using a computer executing stored instructions:
consulting said blockchain to obtain the public signature key in force for the sender,
decrypting, with the public signature key in force of the sender, the data to be shared that are signed digitally in order to obtain said first transmission imprint,
producing a digital imprint called "control imprint" of the original data,
comparing the control imprint and said first transmission imprint,
verifying that the block of the blockchain containing said signed data transaction has been validated, while executing, with a computer of the miner, instructions stored in a memory for example,
not taking into account said signed data transaction if the control imprint and said first transmission imprint are different or if said block of the blockchain containing said signed data transaction has not been validated.

Thus, when a recipient wants to ensure the authenticity and integrity of recorded and received data, said recipient calculates the imprint of the original data and compares it with the imprint contained in the appropriate block. The other information in the record has not been verified, since it already was before mining the corresponding block.

According to another aspect, to record a transaction called "encrypted data transaction" in the blockchain, said encrypted data transaction comprising data to be shared that are digitally encrypted, the data to be shared including original data or a digital imprint of the original data called "second transmission imprint" obtained using a hash method, the encrypted data transaction being intended for a second player called "recipient," the method includes the following operations, optionally carried out using a computer executing stored instructions:

consulting the blockchain to obtain the public encryption key in force assigned to the recipient,
creating a symmetrical encryption key for the data to be shared with said symmetrical key to obtain data to be shared digitally encrypted with said symmetrical key,
encrypting the symmetrical key by using the public encryption key of the recipient to obtain a symmetrical key digitally encrypted with said public key,
sending the network the encrypted data transaction, said encrypted data transaction including said data to be shared digitally encrypted with said symmetrical key and said symmetrical key digitally encrypted with said public key of the recipient, creating a block called "new block" by a player called "miner," said new block comprising at least one imprint of the last block of the blockchain, said encrypted data transaction,
validation of the new block by at least one player,
insertion of the new block into the blockchain.

When the data to be shared take the form of the second transmission imprint, a recipient having received the original data, said method includes the following operations, optionally using a computer executing stored instructions:
verifying said encrypted data transaction by:
decrypting by using the private encryption key in force of the recipient of the symmetrical key encrypted with the public encryption key of the recipient,
decrypting by using said symmetrical key of the data to be shared encrypted with said symmetrical key to obtain the second transmission imprint,
producing a digital imprint called "verification imprint" of the original data,
comparing the verification imprint and said second transmission imprint,
not taking into account said encrypted data transaction if the verification imprint and said second transmission imprint are different.

According to one aspect, at least one data transaction comprises the identity of the sender and/or a record number and/or a date.

Furthermore, the method makes it possible to automate certain actions. This property is referred to as "Smart Contract."

For example, a maintenance procedure may require the application of restrictive procedures to download new software to be implemented on an aircraft. An operator must verify the authenticity and integrity of the software to be downloaded on board the avionics system.

When the data to be downloaded are present in the blockchain of the aircraft, these data to be downloaded have in fact been verified. The prerequisite maintenance operations for this download therefore been carried out upstream, which makes the operator's work easier.

The method may also make it easier to provide access to certain resources based on the role and/or assurance level of a player recorded in his identity record.

Aside from a method, the invention relates to a data sharing system. This data sharing system includes, for each player on the network, at least one computer for carrying out said method, at least one computer of at least one player storing the blockchain.

BRIEF DESCRIPTION OF THE DRAWINGS

The invention and its advantages will appear in more detail in the context of the following description, with an example provided as an illustration in reference to the sole FIGURE. This sole FIGURE shows a data sharing system according to the invention.

Figure 1:
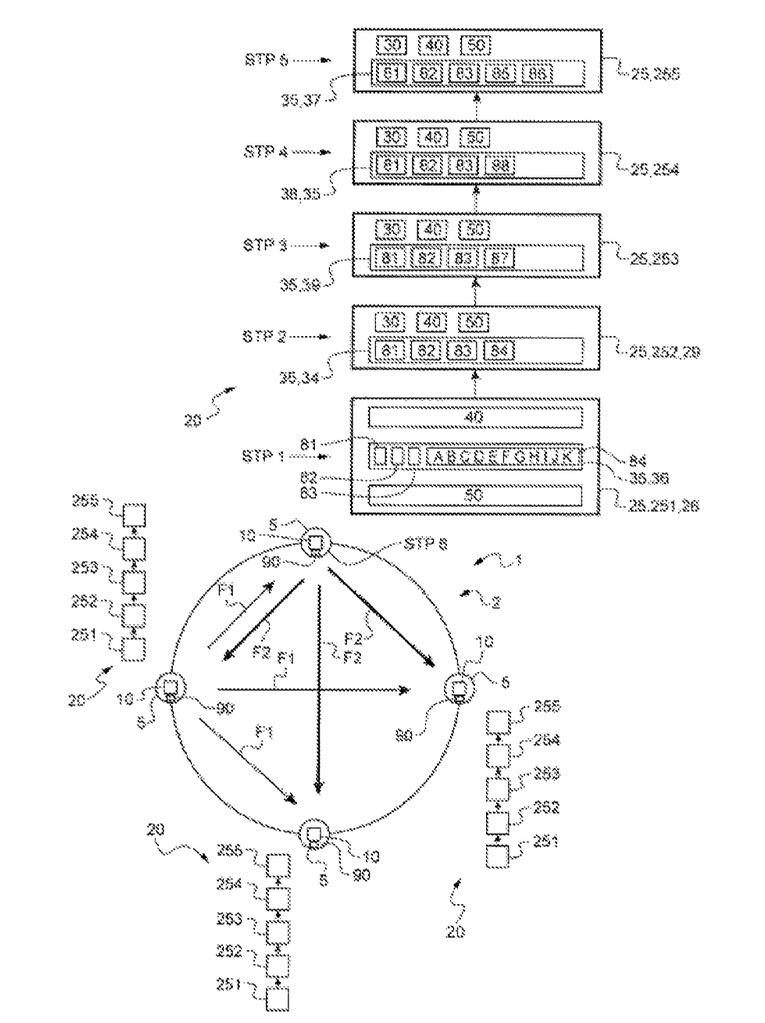

FIG. 1 shows a data sharing system 1 within a computer network 2.

DETAILED DESCRIPTION OF THE INVENTION

This network 2 can be a private network. According to the illustrated example, the network 2 brings together players 5 in the aeronautic and aerospace field. However, the invention is applicable to other fields, and for example the automotive field, the maritime field, etc. In the context of a network in the aeronautic and aerospace field, the players 5 can be aircraft manufacturers, operators using these aircraft, government entities, suppliers for manufacturers, aircraft, etc.

The players can be grouped together into several groups depending on their rights within the network. Thus, the players in the network are divided into major players, subordinate players and computer equipment, the expressions major players/subordinate players/computer equipment being used for convenience to refer to these different groups of players. The term "player" used alone may thus refer to a major player or a subordinate player or computer equipment. A major player has the power to record a new player on the network, who may be another major player or a subordinate player or computer equipment. A subordinate player has the power to record only computer equipment on the network. Lastly, computer equipment is an electronic member able to communicate with the other players, such as an on-board computer of an aircraft, for example.

Each player 5 may comprise at least one computer 10 connected to the network, said computer 10 executing stored instructions to carry out the method according to the invention for example through typical software, logic circuits, etc. The computers of the players communicate with one another and additionally have a memory unit.

This method implements the blockchain technology. Thus, the network uses a blockchain 20. This blockchain 20 is stored in a computer memory 10 of players called "miners" for convenience. According to one alternative, all of the players represent nodes of the network 2 and store the blockchain 20. Furthermore, each player 5 can use a computer program stored on its computer to consult the blockchain 20, independently of the location where said blockchain is stored.

Traditionally, the blockchain 20 includes a plurality of blocks 25, one after the other. According to the illustrated example, the blockchain 20 includes, at a current moment, five blocks 251, 252, 253, 254, 255 extending from a first block 251 to the last created block 255.

Each block 25 includes at least one transaction 35. Each transaction 35 includes data stored and made available to the network. These data can take the form of a datum as such, or a digital imprint of said datum. A computer 10 of a player may in fact comprise hash software for converting a datum in order to obtain a digital imprint of said datum by applying a traditional hash algorithm. Such a digital imprint is sometimes called "hash." Thus, the datum may take the form of a computer file, for example, or a digital imprint of said computer file.

When the transaction 35 includes the digital imprint of a datum, the datum as such may also be included in the transaction. For example, a transaction includes computer software to be onboarded in an aircraft and a digital imprint of said computer software.

Furthermore, at least one transaction 35 may include information dating the transmission of the transaction 35, and/or the identity of the player 5 having sent the transaction with its computer and/or a record number making it possible to find the transaction easily.

Furthermore, at least one block 25 may comprise information 40 dating the creation of said block 25.

Standard time stamping software and methods may be used.

Furthermore, each block 25 may include a measurement 50 of a quantity of work that was necessary to produce the new block. The creation of a block may be undertaken by a computer 10 of the network 2 by using a traditional consensus method, for example the "proof of work" method. Such a measurement is sometimes called "nonce." Alternatively or additionally, a consensus method by proof of stake may be undertaken.

Furthermore, each block different from the first block 251 includes a digital imprint 30 of the previous block. Thus, the second block 252 includes a digital imprint of the first block 251, and so forth.

According to the inventive method, the network may make it possible to encrypt the data shared between the players, by digitally signing the data using a standard method using the computers 10 or by digitally encrypting the data using a standard method using the computers 10. In particular, the method may seek to use an asymmetrical cryptographic method with double keys. Each player 5 is thus in possession of several double keys that each include a private key that corresponds to a public key, the private key/public key pair forming an asymmetrical double key granted to said player. The private key of a player is, except in case of incident, only known by that player, while the public key is visible by all of the other players.

The method applied by the data sharing system 1 then includes an initialization step STP1 seeking to initialize the blockchain.

During this initialization step STP1, a predetermined authority intervenes periodically to mine the first block 251 of the blockchain with a computer, and optionally one or several blocks following said first block 251. These blocks mined by the predetermined authority are called "initialization blocks 26" for convenience so as to be distinguished easily from the other blocks of the blockchain.

The predetermined authority uses a computer to insert, into each initialization block 26, at least one transaction, called "initialization transaction 36" for convenience, by applying a standard algorithm.

This initialization transaction 36 includes an identity record 84 assigned to a player. Each player identified in an identity record of an initialization transaction 36 is called "major player" to be distinguished from the other players.

The initialization transaction 36 may also comprise a record number 81, the identity 82 of the authority, date information 83 of the initialization transaction 36 being able to include the date or even the time of said initialization transaction 36, etc.

According to one aspect, and identity record 84 of a player comprising identification data of said player that includes at least one identifier A, B, C of said player. An identifier of a player may assume the form of a name A of said player, an address B of said player or a role C of said player within the network.

Furthermore, the identification data of said player comprise a public key D of a double key called signature double key of said player, a public key E of a double key called encryption double key of said player, a public key F of a double key called revocation double key of said player.

Optionally, the identification data of said player comprise a public key G of a double key called authentication double key.

Optionally, the identification data of said player comprise an identification H of the cryptographic algorithms associated with said double keys D, E, F, G, i.e., respectively, an identification of a signature cryptographic algorithm associated with said signature double key of said player, an identification of an encryption cryptographic algorithm associated with said encryption double key, an identification of a revocation cryptographic algorithm, and an identification of an authentication cryptographic algorithm.

Optionally, the identification data of said player comprise a validity date I of certain double keys, i.e., respectively, a validity date of said signature double key, a validity date of said encryption double key and a validity date of said authentication double key.

Optionally, the identification data for said player comprise an importance level J of said player and/or an assurance level K of said player.

To implement the initialization step, the predetermined authority may execute instructions stored on a computer. The predetermined authority then activates software applying a standard algorithm within a computer to mine each initialization block, by arranging, within each initialization block, at least one digital imprint of the last block of the blockchain and one or several identity record(s) respectively relative to one or several major player(s). Optionally, the identification data may be signed digitally with a private key of a double key that belongs to the predetermined authority.

The predetermined authority no longer intervenes at the end of this initialization step, or may intervene periodically only during a reinitialization step.

Furthermore, at the end of this initialization step, the registration of new players is done by carrying out an acceptance step of a new player STP2. This step is illustrated by the second block 252 of the blockchain. The step for acceptance of a new player STP2 includes an operation for storage of at least one registration block for a new player 29 by one said major or subordinate player using at least one computer. Such a registration block for a new player 29 in particular comprises at least one said transaction 34 that includes an identity record of said new player.

To store a new player, an already-recorded player requests the execution of instructions stored on its computer to send, in said network, a request including an identity record 84 of the new player.

Another player on the network mines a block of one said identification block of a new player 29 that includes said identity record 84 of the new player, by executing instructions stored on its computer. Optionally, the player on the network that mines the block performs verifications before mining the block. For example, said player verifies the identity of the new player and/or verifies the cryptographic algorithms used and/or verifies the possession by the new player of the private keys associated with the public keys of the record. In case of error, the transaction is ignored. The verifications can be automated by being done by a computer.

If the identification block of a new player 29 is mined, this identification block of a new player 29 must next be validated by at least one player of the blockchain separate from the player having done said mining.

For example, the identification block is transmitted along arrows F1 in the network for validation according to standard methods by at least one player. A validation by a predetermined number of players may be required. For example, the validation of a block may require the validation of the block by at least two players housed on different continents. The proof of stake method may be implemented by using, if applicable, the importance level of the players of the network. When the new block is validated by a player, said player sends this information along the arrows F2 into the network using a computer and appropriate software.

After validation, the identification block of a new player 29 is stored in the blockchain. The blockchain may be duplicated automatically on each of the computers of the network in the standard manner.

Furthermore, the identification data may also be modified according to one embodiment.

Thus, the method may include a modification step STP3 illustrated with the third block 253. During this modification step STP3, a player 5 may modify its identification data by replacing the identification data in force of said player called, for convenience, "old identification data," with identification data called, for convenience, "new identification data."

During a step for modifying keys STP3, a player modifies at least one said double key belonging to it including a public key in force to be modified and a private key in force to be modified. This modification may be undertaken if applicable before expiration of a validity date associated with the double key, for example.

Thus, a player may address a computer to execute stored instructions in order to generate a new double key including a new public key and a new private key. This player may address a computer to execute stored instructions in order to create and send the network an identification transaction 87 comprising an identifier A, B, C of said player and the public key in force as well as the new public key and a cryptographic algorithm associated with said new public key. The identification transaction comprises said new public key and said identifier digitally signed with the private key in force as well as said identifier digitally signed with the new private key. This identification transaction may then be inserted by a miner in the standard manner into a new block of the blockchain, the third block according to the provided example.

To insert the identification transaction into a new block, the miner may first verify this identification transaction. Thus, the miner addresses a computer to execute instructions making it possible to verify that the public key in force belongs to the player having said identifier by consulting the blockchain with a computer. Furthermore, the miner performs a first decryption with a computer of the new public key and the digitally signed identifier by using the public key in force, then determines the presence or absence of a first equivalence between said new public key and said identifier obtained by said first decryption and respectively the public key in force and the identifier that are stored in the identification transaction.

The miner performs a second decryption with a computer of the digitally signed identifier by using the new public key, then determines the presence or absence of a second equivalence between said identifier obtained by the second decryption and the identifier stored in the identification transaction.

The miner validates the identification transaction in the presence of the first equivalence and the second equivalence, and then mines the new block according to a standard method.

This new block is introduced in the standard manner into the blockchain, optionally by applying a consensus method to require the validation of a referent number of players.

Likewise, the method may also include a revocation step STP4 to revoke at least one double key of a player including a public key in force to be revoked and a private key in force to be revoked.

Thus, a player may address a computer to execute stored instructions in order to generate a new double key including a new public key and a new private key. This player may address a computer to execute stored instructions in order to create and send the network a revocation transaction 88 comprising an identifier A, B, C of said player, the public revocation key of said player as well as the new public key and a cryptographic algorithm associated with said new public key. The revocation transaction comprises said new public key and said identifier digitally signed with the private revocation key as well as said identifier digitally signed with the new private key. This revocation transaction may then be inserted by a miner in the standard manner into a new block of the blockchain, the third block according to the provided example.

To insert the revocation transaction into a new block, the miner may first verify this revocation transaction. Thus, the miner addresses a computer to execute instructions making it possible to verify that the public revocation key belongs to the player having said identifier by consulting the blockchain with a computer. Furthermore, the miner performs a first decryption with a computer of the new public key and the digitally signed identifier by using the public revocation key, then determines the presence or absence of a first equivalence between said new public key and said identifier obtained by said first decryption and respectively the public key in force and the identifier that are stored in the identification transaction.

The miner performs a second decryption with a computer of the digitally signed identifier by using the new public key, then determines the presence or absence of a second equivalence between said identifier obtained by the second decryption and the identifier stored in the revocation transaction.

The miner validates the revocation transaction in the presence of the first equivalence and the second equivalence, and then mines the new block according to a standard method.

The blockchain can also store data to be shared that differ from the identification data.

Thus, a transaction called "data transaction 37" for convenience may contain data called "data to be shared" of another type, for example aeronautic data.

To sign data digitally, a player called "sender" addresses a computer by using its signature private key to sign the data digitally, for example using a standard algorithm. Another player called "recipient" can then consult said blockchain with a computer program of a computer 10 in order to obtain the public signature key of the sender in order to decrypt the data signed by the sender.

For example, the method makes it possible to record, in the blockchain, a transaction called "signed data transaction" during a step STP5. The signed data transaction comprises data to be shared that are signed digitally, the data to be shared including original data 85 and/or a digital imprint of the original data called "first transmission imprint 86."

A sender can then encrypt the data to be shared by signing them with its private key to obtain data called "signed data to be shared."

According to one option, a sender can sign the original data to obtain the signed data to be shared.

According to another option, the sender uses a standard hash algorithm with a calculator to obtain the first transmission imprint 86. The sender then signs, with its private signature key, said first transmission imprint to obtain the signed data to be shared. The signed data transaction may then include the signed data to be shared in the form of a first signed transmission imprint. The unsigned original data may additionally be included in the transaction or transmitted by another channel to a recipient, for example by hand, by mail, etc.

The sender then sends the signed data transaction including the signed data to be shared to the network with a computer.

A so-called "mining" player of the network then creates a block called "new block" for convenience using a standard algorithm and a calculator, this new block comprising at least one digital imprint of the last block of the blockchain, called signed data transaction, or even a measurement of a quantity of work that was necessary to produce the new block.

This new block is transmitted along arrows F1 in the network for validation according to standard methods by at least one player. A validation by a predetermined number of players may be required. For example, the validation of a block may require the validation of the block by at least two players housed on different continents.

When the new block is validated by a player, said player sends this information along the arrows F2.

After validation, the new block is inserted in the last position in the blockchain.

When the data to be shared are of the "first transmission imprint" type and if the miners have received the original data in parallel, the method may include a verification phase carried out before building the new block.

A miner may then, with a computer program of a computer, consult the blockchain in order to obtain the public signature key in force of the sender. The miner decrypts the signed data to be shared with said public signature key, by applying a standard algorithm for example, to obtain the first transmission imprint. In parallel, the miner uses a calculator to produce a digital imprint called "control imprint" of the original data and compares the control imprint and the first transmission imprint.

If one or more differences exist between the control imprint and the first transmission imprint, the new block is for example not created.

If the block is created, a user can address the blockchain to access the signed data transaction.

Thus, the recipient addresses a computer program of a calculator to consult the blockchain in order to extract the public signature key in force of the sender therefrom, namely the public signature key in force during the transmission of the transaction in question.

The recipient implements a decryption algorithm in order to decrypt the signed data to be shared with said public signature key, in order to obtain the unsigned data to be shared.

Optionally, when the data to be shared assume the form of the first transmission imprint, the unsigned data to be shared assume the form of the first transmission imprint.

Furthermore, the recipient can verify the signed data transaction before using the data in question.

Indeed, the recipient can produce a digital imprint of the received original data, also called "control imprint" for convenience, and compares the control imprint and the first transmission imprint.

This recipient also observes the blockchain to verify that the block of the blockchain containing the signed data transaction has been validated.

Then, the recipient ignores the encrypted data transaction if the control imprint and the first transmission imprint are different and/or if said block of the blockchain containing said signed data transaction has not been validated.

For example, if the original data relates to software to be onboarded in an aircraft, an operator does not install the software.

According to another aspect, the method may allow digital encryption of the data and transmission to a player called "recipient."

A sender can then consult the blockchain with a computer program of a calculator to extract the public encryption key in force therefrom assigned to the recipient of the data.

Furthermore, the sender creates a symmetrical key, for example from a standard method and its double encryption key. Such a symmetrical key is sometimes called "transfer key." The sender then encrypts the data to be shared with the symmetrical key, using an encryption key that may be standard, which minimizes the computing times. Furthermore, the sender encrypts the symmetrical key with the public encryption key of the recipient by using an encryption algorithm, for example standard, to obtain a digitally encrypted symmetrical key.

According to one option, a sender can then encrypt original data to obtain the encrypted data to be shared.

According to another option, the sender uses a standard algorithm with a calculator to obtain an imprint called "second transmission imprint" of the original data. The sender then encrypts said second transmission imprint with the symmetrical key to obtain the encrypted data to be shared.

The encrypted data to be shared are optionally sent by another channel to the recipient.

The encrypted data to be shared and the encrypted symmetrical key are also sent to the network to record the transaction in the blockchain. Such a transaction is called "encrypted data transaction" for convenience. The encrypted data transaction may thus include the encrypted data to be shared with said symmetrical key and the encrypted symmetrical key with said public key of the recipient. The original data may be included in the transaction or transmitted by another channel to a recipient, for example by hand, by mail, etc.

The sender then sends the encrypted data transaction including the data to be shared and the encrypted symmetrical key to the network with a computer.

A so-called "mining" player of the network then creates a block called "new block," this new block comprising at least one digital imprint of the last block of the blockchain, called encrypted data transaction, or even a measurement of a quantity of work that was necessary to produce the new block.

This new block is transmitted along arrows F1 in the network for validation according to standard methods by at least one player. When the new block is validated by a player, said player sends this information along the arrows F2. After validation, the new block is inserted in the last position in the blockchain.

Thus, the recipient can address the blockchain to access the encrypted data transaction. The recipient implements a decryption algorithm to decrypt the symmetrical key contained in the transaction with its private encryption key. Next, the recipient decrypts the encrypted data to be shared present in the transaction with said symmetrical key.

When the data to be shared assume the form of the second transmission imprint, the recipient thus obtains the second transmission imprint.

Furthermore, the recipient can produce a digital imprint of the received original data, also called "verification imprint" for convenience, and compares the verification imprint and the second transmission imprint.

This recipient also observes the blockchain to verify that the block of the blockchain containing the signed data transaction has been validated.

Then, the recipient ignores the encrypted data transaction if the verification imprint and said second transmission imprint are different or if said block of the blockchain containing said encrypted data transaction has not been validated.

According to another aspect, the method may include a key sequestration step STP6 for each player. During this step, a player creates a copy 90 of its double encryption key. This copy 90 is then encrypted using a computer executing stored information and a public key of a double key of a security officer of said player. The copy thus encrypted is then encrypted again with a public encryption key of a major player different from said player having created the copy 90.

Naturally, the present invention is subject to many variations regarding its implementation. Although several embodiments have been described, it is understood that it is not conceivable to identify all possible embodiments exhaustively. It is of course possible to consider replacing one described means by an equivalent means without going beyond the scope of the present invention.

In particular, a same block may comprise transactions of various types. For example, a block may comprise a data transaction required by one player and a revocation transaction required by another player.

The invention claimed is:

1. A method for sharing data between players on a network, the method comprising a cryptography step for data using an asymmetrical cryptographic method with double keys, each player having at least one double key, a blockchain being implemented, a block comprising a digital imprint of the block preceding it in the blockchain and at least one transaction that comprises data to be shared, at least one block being an initialization block initializing the blockchain and at least one block being a registration block for a new player, at least one player being a major player, at least one player being a subordinate player, and at least one player being a piece of computer equipment, each major player being authorized to request membership in the network for a new major player, a subordinate player, and a new piece of computer equipment, each subordinate player being only authorized to request membership in the network for a new piece of computer equipment, the method including:

a step for initializing (STP1) the blockchain that includes an operation for storage of the at least one initialization block in the blockchain by a predetermined authority using at least one computer, the at least one initialization block comprising at least one transaction that includes an identity record of a major player, a step for acceptance of a new player (STP2) that includes an operation for storage of at least one registration block for a new player in the blockchain by a major/subordinate player using at least one computer, the at least one registration block for a new player comprising at least one transaction that includes an identity record of the new player, one said identity record of a major/subordinate player or piece of computer equipment comprising identification data of the major/subordinate player or piece of computer equipment that includes at least one identifier of the major/subordinate player or piece of computer equipment, a public key of a double key called signature double key of the major player/subordinate player or piece of computer equipment intended for the data signature, a public key of a double key called encryption double key of the major player/subordinate player or computer equipment intended for the data encryption, and a public key of a double key called revocation double key of the major player/subordinate player or computer equipment intended for the revocation of at least one of the encryption double key and the signature double key of the major player/subordinate player or piece of computer equipment, the predetermined authority no longer after the end of the initialization step.

2. The method according to claim 1,
wherein one said identity record of a major player/subordinate player or piece of computer equipment includes an identification of a signature cryptographic algorithm associated with the signature double key of the major player/subordinate player or piece of computer equipment, an identification of an encryption cryptographic algorithm associated with the encryption double key of the major player/subordinate player or piece of computer equipment, an identification of a revocation cryptographic algorithm associated with the revocation double key of the major player/subordinate player or piece of computer equipment.

3. The method according to claim 1,
wherein one identity record of a major player/subordinate player or piece of computer equipment includes a validity date of the signature double key of the major player/subordinate player or piece of computer equipment, and a validity date of the encryption double key of the major player/subordinate player or piece of computer equipment.

4. The method according to claim 1,
characterized in that one said identity record of a major player/subordinate player or piece of computer equipment includes an importance level of the major player/subordinate player or piece of computer equipment used during a validation operation of a block by proof of stake created by the major player/subordinate player or piece of computer equipment.

5. The method according to claim 1,
wherein at least one identifier of a major player/subordinate player or piece of computer equipment includes a name of said major player/subordinate player or piece of computer equipment or an address of said major player/subordinate player or piece of computer equipment.

6. The method according to claim 1,
wherein the identification data of a player includes a level of assurance of the player making it possible to indicate how the player has been identified.

7. The method according to claim 1,
wherein the identity record of a major player/subordinate player or piece of computer equipment includes a public key of a double key called authentication double key of the major player/subordinate player or piece of computer equipment intended for the authentication of the major player/subordinate player or piece of computer equipment.

8. The method according to claim 1,
wherein the operation for storing at least one recording block of a new player includes the following operations:
sending, into the network, a request including one identity record of the new player,
mining by one player of the blockchain of one identification block of a new player including the identity record of the new player,
validation of the block by at least one player of the blockchain separate from the player having performed the mining, and storing the block in the blockchain after the validation.

9. The method according to claim 1,
wherein the method includes a step for modifying keys (STP3) during which one player modifies at least one double key belonging to it including a public key in force and a private key in force, the modification step comprising the following operations:
generating a new double key including a new public double key and a new private double key,
creating and sending the network a transaction called identification transaction comprising an identifier of the player and the public key in force as well as the new public key and a cryptographic algorithm associated with the new public key, the identification transaction comprising the new public key and the identifier digitally signed with the private key in force as well as the identifier digitally signed with the new private key,
inserting the identification transaction into a new block of the blockchain.

10. The method according to claim 9,
wherein the operation for inserting the identification transaction into a new block of the blockchain includes:
a phase for verification of the identification transaction by at least one player of said network that includes:
a verification that the public key in force belongs to the player having the identifier by consulting the blockchain with a computer,
a first decryption with a computer and the public key in force of the new public key and the identifier signed digitally by the private key in force,
a determination of a first equivalence between the new public key and the identifier obtained by the first decryption and respectively the public key in force and the identifier that are stored in the identification transaction,
a second decryption with a computer and the new public key of the identifier signed digitally by the new private key,
a determination of a second equivalence between said identifier obtained by said second decryption and the identifier stored in the identification transaction,
validation of said identification transaction in the presence of the first equivalence and the second equivalence,
a phase for creating a new block including said identification transaction.

11. The method according to claim 1,
wherein the method includes a revocation step (STP4) during which one player revokes at least one double key belonging to it including a public key in force and a private key in force, the revocation step comprising the following operations:
generating a new double key including a new public double key and a new private double key, having to replace the revoked double key including a public key in force and a private key in force,
creating and sending the network a revocation transaction comprising an identifier of the player and the public revocation key of the player and the public key in force to be revoked as well as the new public key and a cryptographic algorithm associated with said new public key, the revocation transaction comprising the new public key and the identifier digitally signed with the private revocation key as well as said identifier digitally signed with the new private key, inserting the revocation transaction into a new block of the blockchain.

12. The method according to claim 11,
wherein the operation for inserting the revocation transaction into a new block of the blockchain includes:
a phase for verification of the revocation transaction by at least one player of the network that includes:
a verification that the public revocation key belongs to the player having the identifier by consulting the blockchain with a computer,
a first decryption with a computer and the public revocation key of the new public key and the identifier signed digitally by the private revocation key,
a determination of a first equivalence between the new public key and the identifier obtained by the first decryption and respectively the public key in force and the identifier that are stored in the revocation transaction,
a second decryption with a computer and the new public key of the identifier signed digitally by the new private key,
a determination of a second equivalence between the identifier obtained by the second decryption and the identifier stored in the revocation transaction,
validation of the new block in the presence of the first equivalence and the second equivalence,
a phase for creating a new block including the revocation transaction.

13. The method according to claim 1,
wherein the method includes a key sequestration step (STP6) that includes the following operations for one the player:
creating a copy of the encryption double key of the player,
encrypting the copy with a public key of an encryption double key of a security officer of the player, then encryption with a public encryption key of a major player different from the player.

14. The method according to claim 1,
wherein to record a transaction called signed data transaction in the blockchain, the signed data transaction comprising data to be shared that are signed digitally, the data to be shared including original data or a digital imprint of the original data called first transmission imprint obtained using a hash method, the method including the following operations:
encryption of the data to be shared, which are to be signed digitally by signing them with the private signature key of a player called sender, to obtain the data to be shared that are signed digitally,
sending the network the signed data transaction including the data to be shared that are signed digitally,
creating a block called new block by a player called miner, the new block comprising at least one digital imprint of the last block of the blockchain and the signed data transaction,
validation of the new block by at least one the player,
insertion of the new block into the blockchain after the validation.

15. The method according to claim 14,
wherein the data to be shared take the form of one first transmission imprint, the miner having received the original data, the method includes a verification operation carried out before building the new block comprising the following operations:
consulting the blockchain to obtain the public signature key in force for the sender,
decrypting, with the public signature key in force of the sender, data to be shared that are signed digitally in order to obtain the first transmission imprint,
producing a digital imprint called "control imprint" of the original data,
comparing the control imprint and the first transmission imprint.

16. The method according to claim 15,
wherein the data to be shared take the form of one the first transmission imprint, a recipient performs the following operations:
verifying the encrypted data transaction by:
consulting the blockchain to obtain the public signature key in force for the sender,
decrypting, with the public signature key in force of the sender, the data to be shared that are signed digitally in order to obtain the first transmission imprint,
producing a digital imprint called "control imprint" of the original data,
comparing the control imprint and the first transmission imprint,
verifying that the block of the blockchain containing the signed data transaction has been validated,
not taking into account the signed data transaction if the control imprint and the first transmission imprint are different or if the block of the blockchain containing the signed data transaction has not been validated.

17. The method according to claim 1,
wherein to record a transaction called encrypted data transaction in the blockchain, the encrypted data transaction comprising data to be shared that are digitally encrypted, the data to be shared including original data or a digital imprint of the original data called second transmission imprint is obtained using a hash method, the encrypted data transaction being intended for a second player called recipient, the method including the following operations:
consulting the blockchain to obtain the public encryption key in force assigned to the recipient,
creating a symmetrical encryption key for the data to be shared with the symmetrical key to obtain data to be shared digitally encrypted with the symmetrical key,
encrypting the symmetrical key by using the public encryption key of the recipient to obtain a symmetrical key digitally encrypted with the public key,
sending the network the encrypted data transaction, the encrypted data transaction including the data to be shared digitally encrypted with the symmetrical key and the symmetrical key digitally encrypted with the public key of the recipient,
creating a block called new block by a player called miner, the new block comprising at least one imprint of the last block of the blockchain, the encrypted data transaction,
validating the new block by at least one player,
inserting the new block into the blockchain.

18. The method according to claim 17,
wherein when the data to be shared take the form of the second transmission imprint, a recipient having received the original data, the method including the following operations:
verifying the encrypted data transaction by:

decrypting by using the private encryption key in force of the recipient of the symmetrical key encrypted with the public encryption key of the recipient, decrypting by using the symmetrical key of the data to be shared encrypted with the symmetrical key to obtain the second transmission imprint, producing a digital imprint called verification imprint of the original data, comparing the verification imprint and the second transmission imprint, not taking into account the encrypted data transaction if the verification imprint and the second transmission imprint are different.

19. A data sharing system, wherein the data sharing system includes, for each player on the network, at least one computer for carrying out the method of claim 1, at least one computer of at least one player storing said blockchain.

20. A method for sharing data between players on a network, the method comprising a cryptography step for data using an asymmetrical cryptographic method with double keys, each player having at least one double key, a blockchain being implemented, a block comprising a digital imprint of the block preceding it in the blockchain and at least one transaction that comprises data to be shared, at least one block being an initialization block initializing the blockchain and at least one block being a registration block for a new player, at least one player being a major player, at least one player being a subordinate player, and at least one player being a piece of computer equipment, each major player being authorized to request membership in the network for a new major player, a subordinate player, and a new piece of computer equipment, each subordinate player being only authorized to request membership in the network for a new piece of computer equipment, the method including:

a step for initializing (STP1) the blockchain that includes an operation for storage of the at least one initialization block in the blockchain by a predetermined authority using at least one computer, the at least one initialization block comprising at least one transaction that includes an identity record of a major player registered for membership in the network by the authority during the operation for storage of the at least one initialization block in the blockchain, a step for acceptance of a new player (STP2) that includes an operation for storage of at least one registration block for a new player, being registered for membership in the network by a major/subordinate player, in the blockchain by the major/subordinate player using at least one computer, the at least one registration block for a new player comprising at least one transaction that includes an identity record of the new player, one said identity record of a major/subordinate player or piece of computer equipment comprising identification data of the major/subordinate player or piece of computer equipment that includes at least one identifier of the major/subordinate player or piece of computer equipment, a public key of a double key called signature double key of the major player/subordinate player or piece of computer equipment intended for the data signature, a public key of a double key called encryption double key of the major player/subordinate player or computer equipment intended for the data encryption, and a public key of a double key called revocation double key of the major player/subordinate player or computer equipment intended for the revocation of at least one of the encryption double key and the signature double key of the major player/subordinate player or piece of computer equipment, the predetermined authority no longer intervening after the end of the initialization step to register for membership in the network any new player and only intervening after the end of the initialization step during a reinitialization step of a player after a revocation of the revocation double key of the player.

* * * * *